US008633850B2

(12) United States Patent
Yu (10) Patent No.: US 8,633,850 B2
(45) Date of Patent: Jan. 21, 2014

(54) IDENTIFYING A LOCATION OF A TARGET OBJECT USING A MONOPULSE RADAR SYSTEM AND SPACE-TIME ADAPTIVE PROCESSING (STAP)

(75) Inventor: Kai-Bor Yu, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 13/281,686

(22) Filed: Oct. 26, 2011

(65) Prior Publication Data

US 2013/0106647 A1 May 2, 2013

(51) Int. Cl.
*G01S 13/42* (2006.01)
(52) U.S. Cl.
USPC ............ 342/107; 342/113; 342/149; 342/152
(58) Field of Classification Search
USPC ..................... 342/80, 107, 113, 147–149, 152
See application file for complete search history.

(56) References Cited

U.S. PATENT DOCUMENTS

| | | | | |
|---|---|---|---|---|
| 3,636,561 A | * | 1/1972 | Le Parquier et al. | 342/149 |
| 4,005,421 A | * | 1/1977 | Dax | 342/148 |
| 4,088,997 A | * | 5/1978 | Winderman | 342/150 |
| 4,214,244 A | | 7/1980 | McKey et al. | |
| 5,051,752 A | * | 9/1991 | Woolley | 342/151 |
| 5,892,478 A | * | 4/1999 | Moss | 342/149 |
| 6,720,910 B2 | | 4/2004 | Yu | |
| 7,859,451 B2 | * | 12/2010 | Yu et al. | 342/149 |
| 7,868,816 B2 | | 1/2011 | Nishidai et al. | |
| 8,237,676 B2 | * | 8/2012 | Duheille et al. | 345/173 |
| 2002/0135517 A1 | * | 9/2002 | Yu et al. | 342/427 |
| 2004/0257270 A1 | * | 12/2004 | Poullin | 342/159 |
| 2008/0030395 A1 | * | 2/2008 | Knick et al. | 342/80 |
| 2009/0213964 A1 | | 8/2009 | Nishidai et al. | |
| 2010/0123617 A1 | * | 5/2010 | Yu et al. | 342/149 |
| 2013/0106647 A1 | * | 5/2013 | Yu | 342/113 |

FOREIGN PATENT DOCUMENTS

| | | |
|---|---|---|
| DE | 3434677 A1 | 4/1986 |
| EP | 1143260 A2 | 10/2001 |
| EP | 1167994A2 A2 | 1/2002 |
| EP | 1862812A2 A2 | 12/2007 |
| GB | 1403350A A | 8/1975 |
| JP | 07198819A A | 8/1995 |

OTHER PUBLICATIONS

Brown et al., "STAP for Clutter Suppression with Sum and Difference Beams," IEEE Transactions on Aerospace and Electronic Systems, vol. 36, No. 2, Apr. 2000, pp. 634-646.

(Continued)

*Primary Examiner* — John B Sotomayor
(74) *Attorney, Agent, or Firm* — Yee & Associates, P.C.

(57) ABSTRACT

A method and apparatus for identifying locations of objects. A portion of a sum signal corresponding to angular locations and velocities with respect to a sensor system that are different from a selected angular location and a selected velocity with respect to the sensor system, respectively, is modified to form a set of modified sum signals. A portion of a difference signal corresponding to the angular locations and the velocities with respect to the sensor system that are different from the selected angular location and the selected velocity with respect to the sensor system, respectively, is modified to form a modified difference signal. An angular location of a target object is identified with respect to the sensor system using the set of modified sum signals and the modified difference signal.

21 Claims, 5 Drawing Sheets

(56) References Cited

OTHER PUBLICATIONS

Fante, "Ground and Airborne Target Detection with Bistatic Adaptive Space-Based Radar," IEEE AES System Magazine, Oct. 1999, pp. 39-44.

GB search report dated Feb. 13, 2013 regarding application GB1218416.4, reference NAM/P124320GB00, applicant The Boeing Company, 7 pages.

* cited by examiner

IDENTIFYING A LOCATION OF A TARGET OBJECT USING A MONOPULSE RADAR SYSTEM AND SPACE-TIME ADAPTIVE PROCESSING (STAP)

BACKGROUND INFORMATION

1. Field

The present disclosure relates generally to detecting objects and, in particular, to detecting objects using radar systems. Still more particularly, the present disclosure relates to a method and apparatus for identifying an angular location of a target object using a radar system.

2. Background

Radar systems are commonly used to detect and/or track objects. For example, a radar system may be used to detect and/or track objects such as, for example, without limitation, an aircraft, an unmanned aerial vehicle, a ship, an automobile, a spacecraft, a living organism, and other still or moving objects. In particular, a radar system uses electromagnetic radiation to determine the distance and/or location of an object with respect to the radar system.

Typically, a radar system transmits pulses of electromagnetic radiation that are reflected off of objects in the path of the electromagnetic radiation. A portion of this reflected electromagnetic radiation is received at the radar system and converted into electrical signals that may be processed to detect and/or track one or more objects of interest.

A monopulse radar system is an example of one type of radar system that is commonly used for detecting and/or tracking objects that are moving. A monopulse radar system is configured to transmit electromagnetic radiation in a focused direction as a beam using beamforming techniques. The portions of reflected electromagnetic radiation received at the monopulse radar system for the multiple beams are processed separately and compared to each other. Typically, this processing and comparison are carried out during one pulse for the monopulse radar system.

Typically, a monopulse radar system generates signals that are used to identify an angular location of a target object with respect to the monopulse radar system. The angular location of a target object with respect to a monopulse radar system includes an azimuth angle and an elevation angle of the target object with respect to the monopulse radar system. In other words, the angular location of a target object with respect to a monopulse radar system may be a direction of the target object with respect to the monopulse radar system.

In some situations, a portion of the electromagnetic radiation detected by the monopulse radar system may be undesired electromagnetic radiation. Undesired electromagnetic radiation may include, for example, without limitation, electromagnetic radiation detected in response to noise, clutter, jamming sources, and other sources of undesired electromagnetic radiation.

Clutter typically refers to objects other than the target object that cause the monopulse radar system to detect undesired electromagnetic radiation. These objects may include, for example, without limitation, the ground, the sea, precipitation, animals, trees, atmospheric turbulence, buildings, radar countermeasures, and other types of objects.

Identifying the angular location of a target object when undesired electromagnetic radiation is detected at the monopulse radar system may be more difficult than desired using currently available techniques for signal processing. Further, some currently available techniques may not allow the angular location of the target object to be identified with a desired level of accuracy.

Therefore, it would be advantageous to have a method and apparatus that takes into account at least some of the issues discussed above, as well as possibly other issues.

SUMMARY

In one advantageous embodiment, a method for identifying locations of objects is provided. A portion of a sum signal corresponding to angular locations and velocities with respect to a sensor system that are different from a selected angular location and a selected velocity with respect to the sensor system, respectively, is modified to form a set of modified sum signals. A portion of a difference signal corresponding to the angular locations and the velocities with respect to the sensor system that are different from the selected angular location and the selected velocity with respect to the sensor system, respectively, is modified to form a modified difference signal. An angular location of a target object is identified with respect to the sensor system using the set of modified sum signals and the modified difference signal.

In another advantageous embodiment, an apparatus comprises a signal processing system. The signal processing system is configured to modify a portion of a sum signal corresponding to angular locations and velocities with respect to a sensor system that are different from a selected angular location and a selected velocity with respect to the sensor system, respectively, to form a set of modified sum signals. The signal processing system is further configured to modify a portion of a difference signal corresponding to the angular locations and the velocities with respect to the sensor system that are different from the selected angular location and the selected velocity with respect to the sensor system, respectively, to form a modified difference signal. The signal processing system is further configured to identify an angular location of a target object with respect to the sensor system using the set of modified sum signals and the modified difference signal.

In another advantageous embodiment, a computer system comprises a bus system, a storage device, and a processor unit. The storage device is connected to the bus system. Program code is stored in the storage device. The processor unit is connected to the bus system. The processor unit is configured to run the program code to modify a portion of a sum signal corresponding to angular locations and velocities with respect to a sensor system that are different from a selected angular location and a selected velocity with respect to the sensor system, respectively, to form a set of modified sum signals. The processor unit is further configured to modify a portion of a difference signal corresponding to the angular locations and the velocities with respect to the sensor system that are different from the selected angular location and the selected velocity with respect to the sensor system, respectively, to form a modified difference signal. The processor unit is further configured to identify an angular location of a target object with respect to the sensor system using the set of modified sum signals and the modified difference signal.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The different advantageous embodiments recognize and take into account different considerations. For example, the different advantageous embodiments recognize and take into account that a monopulse radar system typically comprises an array of antenna elements. The electrical signals generated by this array of antenna elements are used to generate a sum signal, an azimuth difference signal, and an elevation difference signal in response to detecting electromagnetic radiation.

Currently used techniques for identifying the angular location of a target object with respect to a monopulse radar system include processing and comparing these signals. In particular, some currently used techniques for identifying the angular location of a target object include identifying an azimuth monopulse ratio and an elevation monopulse ratio for the monopulse radar system. The azimuth monopulse ratio is the ratio of the azimuth difference signal to the sum signal. The elevation monopulse ratio is the ratio of the elevation difference signal to the sum signal.

The different advantageous embodiments recognize and take into account that these monopulse ratios may be compared with values for monopulse ratios in look-up tables generated for the particular monopulse radar system. These look-up tables identify values for the monopulse ratios when a target object is at a plurality of angular locations with respect to the monopulse radar system under ideal conditions. As used herein, "ideal conditions" are conditions in which noise is absent and/or other forms of undesired electromagnetic radiation are not detected at the monopulse radar system.

The different advantageous embodiments recognize and take into account that detecting a target object and identifying an angular location of the target object may be more difficult than desired when sources of undesired electromagnetic radiation are present. Some currently available systems use space-time adaptive processing (STAP) to reduce or modify the portion or portions of the sum signal caused by these sources of undesired electromagnetic radiation. However, with currently available techniques for space-time adaptive processing, the azimuth monopulse ratio and the elevation monopulse ratio may be distorted such that these monopulse ratios cannot be compared with the look-up tables to identify the angular location of a target object with a desired level of accuracy.

The different advantageous embodiments recognize and take into account that a system for performing space-time adaptive processing that preserves the monopulse ratios within selected tolerances is desirable. Further, the different advantageous embodiments recognize and take into account that another type of difference signal generated by monopulse radar systems, the diagonal difference signal, may be used to reduce or modify the portion or portions of the azimuth difference signal and the elevation difference signal caused by sources of undesired electromagnetic radiation. The different advantageous embodiments recognize and take into account that using the diagonal difference signal may allow the monopulse ratios to be preserved and used with look-up tables to identify the angular locations of target objects with respect to the monopulse radar system.

Thus, the different advantageous embodiments provide a method and apparatus for identifying locations of objects. In one advantageous embodiment, a method for identifying locations of objects is provided. A portion or portions of a sum signal corresponding to angular locations and velocities with respect to a sensor system that are different from a selected angular location and a selected velocity with respect to the sensor system, respectively, is modified to form a set of modified sum signals. A portion or portions of a difference signal corresponding to the angular locations and the velocities with respect to the sensor system that are different from the selected angular location and the selected velocity with respect to the sensor system, respectively, is modified to form a modified difference signal. An angular location of a target object is identified with respect to the sensor system using the set of modified sum signals and the modified difference signal.

Figure 1:
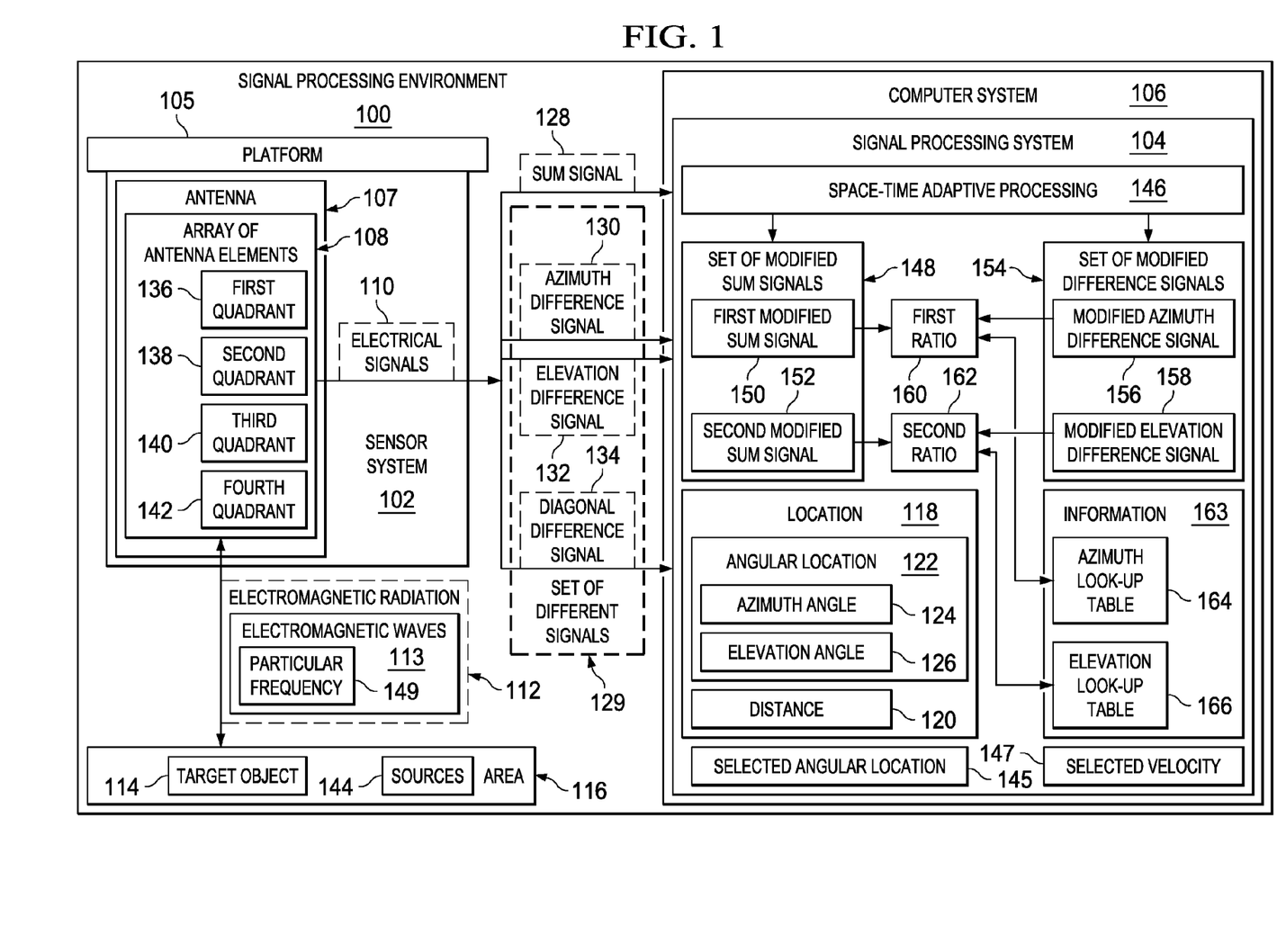
FIG. 1 is an illustration of a block diagram of a signal processing environment in accordance with an advantageous embodiment.

With reference now to FIG. 1, an illustration of a block diagram of a signal processing environment is depicted in accordance with an advantageous embodiment. In these illustrative examples, the signal processing environment 100 includes a sensor system 102 and a signal processing system 104.

The signal processing system 104 may be implemented using hardware, software, or a combination of the two. In these illustrative examples, the signal processing system 104 may be implemented in a computer system 106. The computer system 106 may include a number of computers. As used herein, a "number of" items means one or more items. For example, a number of computers means one or more computers. When more than one computer is present in the computer system 106, these computers may be in communication with each other.

In these illustrative examples, the signal processing system 104 may be in communication with the sensor system 102. In particular, the signal processing system 104 may be electrically connected to the sensor system 102 in these depicted examples. As used herein, when a first component, such as the signal processing system 104, is electrically connected to a second component, such as the sensor system 102, the first component is connected to the second component such that an electrical signal can be sent from the first component to the second component, the second component to the first component, or a combination of the two.

Further, the first component may be electrically connected to the second component without any additional components between the two components. The first component also may be electrically connected to the second component by one or more other components. For example, one electronic device may be electrically connected to a second electronic device without any additional electronic devices between the first electronic device and the second electronic device. In some cases, another electronic device may be present between the two electronic devices that are electrically connected to each other.

In other illustrative examples, the signal processing system 104 may be in a location remote to the sensor system 102. As one illustrative example, the signal processing system 104 may be configured to communicate with the sensor system 102 using wireless communications links, optical links, and/or any other types of communication.

As depicted, the sensor system 102 may be associated with a platform 105. In these illustrative examples, the platform 105 may be a mobile platform. In other words, the platform 105 may be configured to move. The platform 105 may take a number of different forms. For example, without limitation, the platform 105 may be selected from one of an aircraft, a helicopter, an unmanned aerial vehicle (UAV), an automobile, a tank, a truck, a spacecraft, a satellite, a space shuttle, a ship, and any other type of mobile platform. In other illustrative examples, the platform 105 may take the form of a bridge, a structure, a building, or any other type of stationary platform.

In these illustrative examples, the sensor system 102 may take the form of a radar system. As one illustrative example, the sensor system 102 includes an antenna 107. As depicted, the antenna 107 includes an array of antenna elements 108. The array of antenna elements 108 is a two-dimensional array in these examples. In particular, the antenna 107 may be a phased array antenna configured to operate as a monopulse antenna. When the antenna 107 operates as a monopulse antenna, the sensor system 102 may be referred to as a monopulse radar system.

As used herein, a "monopulse antenna" is an antenna configured to identify a location of an object using measurements taken during a single pulse. In particular, the monopulse antenna may be configured to form a single beam when transmitting in a selected direction and form multiple beams in different directions with respect to the selected direction when receiving. These beams may be formed using existing beamforming techniques.

For example, the sensor system 102 may be configured to detect and locate a target object 114 in an area 116. The target object 114 may take a number of different forms. For example, without limitation, the target object 114 may be an aerial vehicle, a ground vehicle, a missile, a ship, a living organism, or any other type of still or moving object. The area 116 may include at least one of a neighborhood, a city, a region of airspace, an area in a forest, an area in an ocean, a desert, or any other defined area.

Detecting and locating the target object 114 may include identifying the location 118 of the target object 114 with respect to the sensor system 102. In these illustrative examples, the location 118 of the target object 114 with respect to the sensor system 102 may comprise a distance 120 of the target object 114 with respect to the sensor system 102 and an angular location 122 of the target object 114 with respect to the sensor system 102. The angular location 122 of the target object 114 may include at least one of an azimuth angle 124 and an elevation angle 126 of the target object 114 with respect to the sensor system 102.

As one illustrative example, the array of antenna elements 108 in the sensor system 102 may be configured to receive electromagnetic radiation 112 reflected off of any objects in the area 116, including the target object 114. This electromagnetic radiation 112 may be received in the form of electromagnetic waves 113. These electromagnetic waves 113 may be referred to as echoes or radar echoes. The array of antenna elements 108 is configured to convert the electromagnetic radiation 112 received at the array of antenna elements 108 into electrical signals 110.

The sensor system 102 may use these electrical signals 110 to generate a sum signal 128. Further, the sensor system 102 may use these electrical signals 110 to generate a set of difference signals 129. This set of difference signals 129 includes an azimuth difference signal 130, an elevation difference signal 132, and a diagonal difference signal 134 in these illustrative examples.

The sensor system 102 sends the sum signal 128, the azimuth difference signal 130, the elevation difference signal 132, and the diagonal difference signal 134 to the signal processing system 104. In these illustrative examples, these signals may be electrical signals. In some cases, these signals may be received at signal processing system 104 in a digital form.

The signal processing system 104 uses the sum signal 128, the azimuth difference signal 130, the elevation difference signal 132, and the diagonal difference signal 134 to detect and locate the target object 114. In particular, the signal processing system 104 uses these signals to identify the location 118 of the target object 114 with respect to the sensor system 102.

For example, the array of antenna elements 108 may be divided into a first quadrant 136, a second quadrant 138, a third quadrant 140, and a fourth quadrant 142. Each of these quadrants may include a same number of antenna elements in the array of antenna elements 108.

In one illustrative example, the first quadrant 136 and the second quadrant 138 may be the two upper quadrants in the array of antenna elements 108. The third quadrant 140 and the fourth quadrant 142 may be the two lower quadrants in the array of antenna elements 108. Further, the first quadrant 136 may be diagonal to the third quadrant 140, while the second quadrant 138 may be diagonal to the fourth quadrant 142.

With this configuration, the sum signal 128, the azimuth difference signal 130, the elevation difference signal 132, and the diagonal difference signal 134 are defined as follows:

$$\Sigma = Q_1 + Q_2 + Q_3 + Q_4$$

$$\Delta_A = (Q_1 + Q_4) - (Q_2 + Q_3)$$

$$\Delta_E = (Q_1 + Q_2) - (Q_3 + Q_4)$$

$$\Delta_\Delta = (Q_1 + Q_3) - (Q_2 + Q_4)$$

where $\Sigma$ is the sum signal 128; $\Delta_A$ is the azimuth difference signal 130; $\Delta_E$ is the elevation difference signal 132; and $\Delta_\Delta$ is the diagonal difference signal 134.

Further, $Q_1$ is the sum of the electrical signals 110 generated by the antenna elements in the first quadrant 136; $Q_2$ is the sum of the electrical signals 110 generated by the antenna elements in the second quadrant 138; $Q_3$ is the sum of the electrical signals 110 generated by the antenna elements in the third quadrant 140; and $Q_4$ is the sum of the electrical signals 110 generated by the antenna elements in the fourth quadrant 142.

In some situations, portions of the electromagnetic waves 113 received at the array of antenna elements 108 may originate from or be reflected off of one or more sources 144 in the area 116 other than the target object 114. These sources 144 may include, for example, without limitation, noise, sources of clutter, jamming sources, and other sources of undesired electromagnetic radiation that are not the target object 114.

As used herein, "clutter" describes undesired echoes of electromagnetic radiation. These undesired echoes may be returned from sources such as, for example, without limitation, the ground, the sea, rain, animals, insects, radar countermeasures, atmospheric turbulences, weather conditions, and other types of possible clutter. When the clutter in a signal is caused by the ground and/or objects located on the ground, this clutter may be referred to as "ground clutter".

The signal processing system 104 is configured to process the sum signal 128, the azimuth difference signal 130, the elevation difference signal 132, and the diagonal difference signal 134 to reduce or modify the portion or portions of these signals caused by sources 144 other than the target object 114. In particular, the signal processing system 104 uses space-time adaptive processing (STAP) 146 to reduce or modify the portions of these signals caused by sources 144 other than the target object 114.

Space-time adaptive processing 146 takes into account both spatial parameters and temporal parameters. For example, space-time adaptive processing 146 takes into account a selected angular location 145 and a selected velocity 147. The selected angular location 145 may be the direction in which the antenna 107 has been electronically steered. The selected velocity 147 may be a velocity predicted for the target object 114 based on a Doppler frequency for the target object 114.

In these illustrative examples, the Doppler frequency is the change in frequency of the electromagnetic waves 113 received at the antenna 107 with respect to the source of the electromagnetic waves 113. As one illustrative example, the antenna 107 may be configured to transmit electromagnetic radiation 112 in the form of electromagnetic waves 113 at a particular frequency 149 towards the selected angular location 145. These electromagnetic waves 113 may be reflected off of a number of surfaces, including a surface of the target object 114.

At least a portion of these electromagnetic waves 113 are received by the antenna 107. In particular, the electromagnetic waves 113 received at the antenna 107 may have frequencies different from the particular frequency 149. The difference between the frequency of an electromagnetic wave and the particular frequency 149 is the Doppler frequency. The Doppler frequency for an electromagnetic wave reflected off the target object 114 depends on a velocity of the target object 114 with respect to the sensor system 102. For example, the target object 114 may be moving and/or the platform 105 associated with the sensor system 102 may be moving.

With space-time adaptive processing 146, the signal processing system 104 modifies the portion or portions of the sum signal 128 corresponding to angular locations and velocities with respect to the sensor system 102 that are different from the selected angular location 145 and the selected velocity 147 with respect to the sensor system 102, respectively, to form a set of modified sum signals 148.

These other angular locations and other velocities may be for sources 144 other than the target object 114. In particular, these other angular locations and other velocities may be for ground clutter. For example, even though ground clutter may not be moving, movement of the platform 105 and/or the sensor system 102 on the platform 105 may cause the ground clutter to appear to have a velocity with respect to the sensor system 102. In this manner, the signal processing system 104 may reduce or modify the contribution of echoes caused by ground clutter and/or sources 144 other than the target object 114 to the sum signal 128.

In this manner, the signal processing system 104 reduces or modifies the portion or portions of the sum signal 128 caused by sources 144 other than the target object 114 to form the set of modified sum signals 148. The set of modified sum signals 148 includes a first modified sum signal 150 and a second modified sum signal 152. The portion or portions of the sum signal 128, caused by sources 144 other than the target object 114, are suppressed in the first modified sum signal 150 and the second modified sum signal 152.

In particular, the signal processing system 104 performs space-time adaptive processing 146 using the sum signal 128 and the elevation difference signal 132 to form the first modified sum signal 150. Further, the signal processing system 104 performs space-time adaptive processing 146 using the sum signal 128 and the azimuth difference signal 130 to form the second modified sum signal 152. In these illustrative examples, the signal processing system 104 may use the first modified sum signal 150 and the second modified sum signal 152 to identify the distance 120 of the target object 114 with respect to the sensor system 102.

Further, in these illustrative examples, with space-time adaptive processing 146, the signal processing system 104 reduces or modifies the portion or portions of the azimuth difference signal 130 and the elevation difference signal 132 corresponding to the angular locations and the velocities with respect to the sensor system 102 that are different from the selected angular location 145 and the selected velocity 147 with respect to the sensor system 102, respectively, to form a set of modified difference signals 154. In this manner, the signal processing system 104 may reduce or modify the contribution of echoes caused by ground clutter and sources 144 other than the target object 114 to the azimuth difference signal 130 and the elevation difference signal 132.

In this manner, the signal processing system 104 uses space-time adaptive processing (STAP) 146 to reduce or modify the portion or portions of the azimuth difference signal 130 and the elevation difference signal 132 caused by sources 144 other than the target object 114 to form the set of modified difference signals 154. The set of modified difference signals 154 includes a modified azimuth difference signal 156 and a modified elevation difference signal 158. The portion or portions of the azimuth difference signal 130 and the elevation difference signal 132 caused by sources 144 other than the target object 114, are suppressed in the modified azimuth difference signal 156 and the modified elevation difference signal 158, respectively.

In particular, the signal processing system 104 performs space-time adaptive processing 146 using the azimuth difference signal 130 and the diagonal difference signal 134 to form the modified azimuth difference signal 156. Further, the signal processing system 104 performs space-time adaptive processing 146 using the elevation difference signal 132 and the diagonal difference signal 134 to form the modified elevation difference signal 158.

In these illustrative examples, the signal processing system 104 uses a first ratio 160 of the modified azimuth difference signal 156 to the first modified sum signal 150 to identify the azimuth angle 124 of the target object 114 with respect to the sensor system 102. Further, the signal processing system 104 uses a second ratio 162 of the modified elevation difference signal 158 to the second modified sum signal 152 to identify the elevation angle 126 of the target object 114 with respect to the sensor system 102.

The first ratio 160 and the second ratio 162 may be referred to as an azimuth monopulse ratio and an elevation monopulse ratio, respectively. The modified signals used to form the first ratio 160 and the second ratio 162 are generated by the signal processing system 104 in a manner that allows information 163 previously generated for the sensor system 102 for identifying an angular location of an object in the absence of noise to be used in identifying the angular location 122 of the target object 114.

This information 163 may include, for example, without limitation, an azimuth look-up table 164 and an elevation look-up table 166. For example, the signal processing system 104 may use the first ratio 160 and the azimuth look-up table 164 to identify the azimuth angle 124 for the target object 114. The signal processing system 104 may use the second ratio 162 and the elevation look-up table 166 to identify the elevation angle 126 for the target object 114.

In these illustrative examples, forming the first ratio 160 and the second ratio 162 using the modified azimuth difference signal 156 and the modified elevation difference signal 158, respectively, ensures that comparing the first ratio 160 and the second ratio 162 to the azimuth look-up table 164 and the elevation look-up table 166, respectively, allows the azimuth angle 124 and the elevation angle 126 to be identified with a desired level of accuracy. In other words, modifying the portion or portions of the azimuth difference signal 130 and the elevation difference signal 132 caused by sources 144 other than the target object 114 using the diagonal difference signal 134 and space-time adaptive processing 146 allows the azimuth angle 124 and the elevation angle 126 to be identified using the azimuth look-up table 164 and the elevation look-up table 166, respectively.

The illustration of signal processing environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in some illustrative examples, the azimuth angle 124 and the elevation angle 126 of the target object 114 with respect to the sensor system 102 may be identified using graphs instead of look-up tables, such as the azimuth look-up table 164 and the elevation look-up table 166. In other illustrative examples, the signal processing system 104 may be considered part of the sensor system 102.

In still other illustrative examples, the electrical signals 110 generated by the array of antenna elements 108 may be the sum signal 128, the azimuth difference signal 130, the elevation difference signal 132, and the diagonal difference signal 134.

Further, depending on the implementation, the sensor system 102 may be attached to a platform in some illustrative examples. For example, the sensor system 102 may take the form of a radar system attached to an unmanned aerial vehicle, an aircraft, an unmanned ground vehicle, a space-based vehicle, a ship, a building, and/or any other type of stationary or mobile platform.

Figure 2:
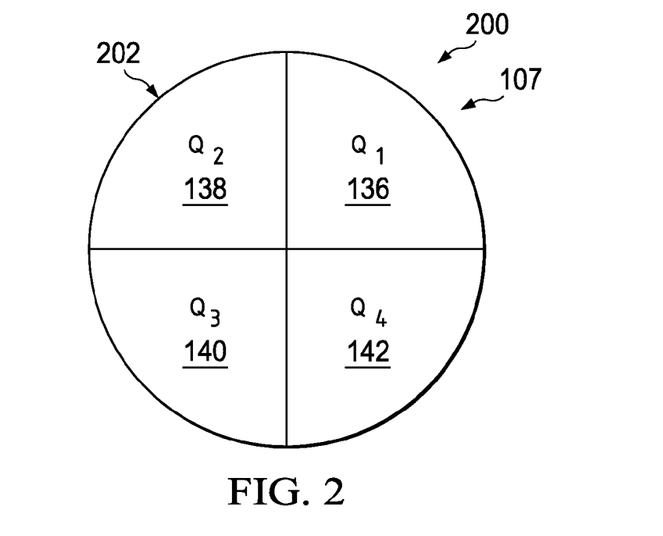
FIG. 2 is an illustration of an antenna in a sensor system in accordance with an advantageous embodiment.

With reference now to FIG. 2, an illustration of an antenna in a sensor system is depicted in accordance with an advantageous embodiment. An example of one implementation for the antenna 107 in FIG. 1 is depicted in FIG. 2. In this illustrative example, the antenna 107 takes the form of a circular antenna 200. In other words, the antenna elements that form the antenna 107 are arranged having a circular shape 202.

As illustrated, the circular antenna 200 is divided into the first quadrant 136, the second quadrant 138, the third quadrant 140, and the fourth quadrant 142 such that each of these quadrants may have a substantially same number of antenna elements. The sum of the electrical signals 110 from FIG. 1 generated by the antenna elements in each of these quadrants may be used to form the sum signal 128, the azimuth difference signal 130, the elevation difference signal 132, and the diagonal difference signal 134 described in FIG. 1.

Figure 3:
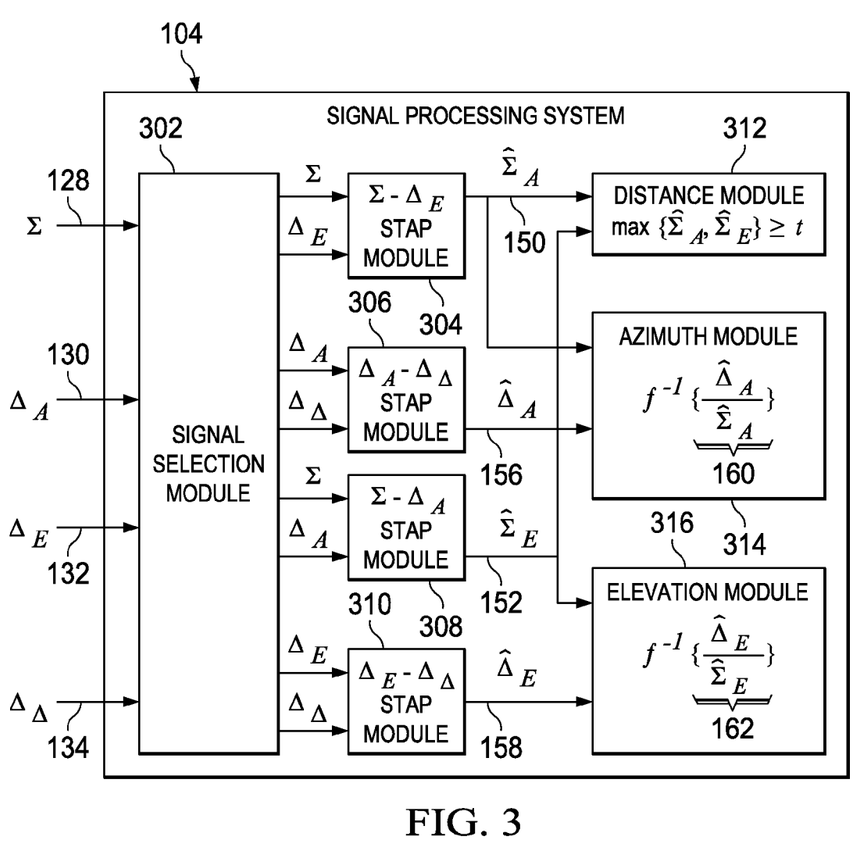
FIG. 3 is an illustration of a signal processing system in accordance with an advantageous embodiment.

With reference now to FIG. 3, an illustration of a signal processing system is depicted in accordance with an advantageous embodiment. In this illustrative example, the signal processing system 104 from FIG. 1 is depicted in greater detail.

The signal processing system 104 may include a signal selection module 302, a first space-time adaptive processing module 304, a second space-time adaptive processing module 306, a third space-time adaptive processing module 308, and a fourth space-time adaptive processing module 310. Further, the signal processing system 104 also may include a detection module 312, an azimuth module 314, and an elevation module 316.

As depicted, the signal processing system 104 receives the sum signal 128, the azimuth difference signal 130, the elevation difference signal 132, and the diagonal difference signal 134 for processing. The signal selection module 302 is configured to select two of the sum signal 128, the azimuth difference signal 130, the elevation difference signal 132, and the diagonal difference signal 134 for processing by each of the different space-time adaptive processing modules.

For example, the signal selection module 302 sends the sum signal 128 and the elevation difference signal 132 to the first space-time adaptive processing module 304. The first space-time adaptive processing module 304 generates the first modified sum signal 150 using the sum signal 128 and the elevation difference signal 132.

As one illustrative example, the sum signal 128 and the elevation difference signal 132 may comprise contributions from both the target object 114 and sources 144 other than the target object 114. Space-time adaptive processing 146 suppresses the contributions of the sources 144 other than the target object 114 to the sum signal 128 and the elevation difference signal 132 to form the first modified sum signal 150. In this manner, the first modified sum signal 150 may comprise mostly the contributions from the target object 114.

For example, the target object 114 may be at a location, (u, v), and may have a velocity with respect to the sensor system 102. The location, (u, v), may correspond to an azimuth angle 124 and an elevation angle 126 for the target object 114 with respect to the sensor system 102 as follows:

$$u = \cos(\text{elevation})\sin(\text{azimuth})$$

$$v = \sin(\text{elevation}),$$

where cos is the cosine function, sin is the sine function, elevation is the elevation angle 126, and azimuth is the azimuth angle 124.

The velocity of the target object 114 with respect to the sensor system 102 may correspond to a Doppler frequency, $f_t$. This Doppler frequency also may be referred to as a Doppler shift. The first modified sum signal 150 is defined as follows:

$$\hat{\sum_A}(u, v, f_t) = \hat{W}_{\Sigma_A}^T \begin{bmatrix} g_\Sigma(u, v)e(f_t) \\ g_{\Delta_E}(u, v)e(f_t) \end{bmatrix} s(t), \text{ where}$$

-continued $$e(f_t) = \begin{bmatrix} 1 \\ e^{j2\pi f_t} \\ \vdots \\ e^{j2\pi(M-1)f_t} \end{bmatrix},$$

$$\hat{W}_{\Sigma_A} = \frac{\begin{bmatrix} R_{\Sigma\Sigma} & R_{\Sigma\Delta_E} \\ R_{\Delta_E\Sigma} & R_{\Delta_E\Delta_E} \end{bmatrix}^{-1} \begin{bmatrix} \delta_0 \\ 0 \end{bmatrix}}{[\delta_0^T \ 0] \begin{bmatrix} R_{\Sigma\Sigma} & R_{\Sigma\Delta_E} \\ R_{\Delta_E\Sigma} & R_{\Delta_E\Delta_E} \end{bmatrix}^{-1} \begin{bmatrix} \delta_0 \\ 0 \end{bmatrix}} = \frac{\begin{bmatrix} A_{11} \\ A_{21} \end{bmatrix} \delta_0}{\delta_0^T A_{11} \delta_0},$$

$$\begin{bmatrix} R_{\Sigma\Sigma} & R_{\Sigma\Delta_E} \\ R_{\Delta_E\Sigma} & R_{\Delta_E\Delta_E} \end{bmatrix}^{-1} = \begin{bmatrix} A_{11} & A_{12} \\ A_{21} & A_{22} \end{bmatrix},$$

$$A_{11} = (R_{\Sigma\Sigma} - R_{\Sigma\Delta_E} R_{\Delta_E\Delta_E}^{-1} R_{\Delta_E\Sigma})^{-1}$$

$$A_{21} = -R_{\Delta_E\Delta_E}^{-1} R_{\Delta_E\Sigma} A_{11}, \text{ and}$$

$$\delta_0 = \begin{bmatrix} 1 \\ 0 \\ \vdots \\ \vdots \\ 0 \end{bmatrix}$$

such that $$\hat{\Sigma}_A(u, v, f_t) = g_\Sigma(u, v) \left[ \left( \frac{\delta_0^T A_{11} e(f_t)}{\delta_0^T A_{11} \delta_0} \right) + \frac{g_{\Delta_E}(u, v)}{g_\Sigma(u, v)} \left( \frac{\delta_0^T A_{21} e(f_t)}{\delta_0^T A_{11} \delta_0} \right) \right] s(t)$$

$$= g_\Sigma(u, v)(H_\Sigma(f_t) + m_E(v) H_{\Delta_E}(f_t)) s(t)$$

$$= g_\Sigma(u, v) \hat{h}(f_t, v) s(t),$$

where $$H_\Sigma(f_t) = \frac{\delta_0^T A_{11} e(f_t)}{\delta_0^H A_{11} \delta_0}$$

$$H_{\Delta_E}(f_t) = \frac{\delta_0^T A_{21} e(f_t)}{\delta_0^H A_{11} \delta_0}$$

$$m_E(v) = \frac{g_{\Delta_E}(u, v)}{g_\Sigma(u, v)}$$

$$\hat{h}(f_t, v) = H_\Sigma(f_t) + m_E(v) H_{\Delta_E}(f_t),$$

where $\hat{\Sigma}_A$ is the first modified sum signal 150; $g_\Sigma(u,v)$ is the radiation pattern corresponding to the sum signal 128; $g_{\Delta_E}(u, v)$ is the radiation pattern corresponding to the elevation difference signal 132; $\hat{W}_{\Sigma_A}$ are the adaptive weights configured to reduce or modify the contributions of sources 144 other than the target object 114 to the radiation patterns corresponding to the sum signal 128 and the elevation difference signal 132; T indicates a complex conjugate transpose; $e(f_t)$ is a Doppler steering vector; M is a total number of pulses over which processing is performed; j is the square root of negative one; π is the number pi; R is a covariance matrix; $H_\Sigma(f_t)$ indicates a Doppler response of the sum signal 128; $H_{\Delta_E}(f_t)$ is a Doppler response of the elevation difference signal 132; s(t) is the amplitude of the signal for the electromagnetic radiation 112 impinging on a center of array of antenna elements 108; and $m_E(v)$ is a ratio of the radiation pattern corresponding to the elevation difference signal 132 to the radiation pattern corresponding to the sum signal 128.

In a similar manner, the signal selection module 302 sends the azimuth difference signal 130 and the diagonal difference signal 134 to the second space-time adaptive processing module 306. The second space-time adaptive processing module 306 generates the modified azimuth difference signal 156 using the azimuth difference signal 130 and the diagonal difference signal 134.

Space-time adaptive processing 146 suppresses the contributions of the sources 144 other than the target object 114 to the azimuth difference signal 130 and the diagonal difference signal 134 to form the modified azimuth difference signal 156. In this manner, the modified azimuth difference signal 156 may comprise mostly the contributions from the target object 114.

The modified azimuth difference signal 156 may be defined as follows:

$$\hat{\Delta}_A = \hat{W}_{\Delta_A}^T \begin{bmatrix} \Delta_A \\ \Delta_\Delta \end{bmatrix}, \text{ where}$$

$$\hat{W}_{\Delta_A} = \frac{\begin{bmatrix} R_{\Delta_A\Delta_A} & R_{\Delta_A\Delta_\Delta} \\ R_{\Delta_\Delta\Delta_A} & R_{\Delta_\Delta\Delta_\Delta} \end{bmatrix}^{-1} \begin{bmatrix} \delta_0 \\ 0 \end{bmatrix}}{[\delta_0^T \ 0] \begin{bmatrix} R_{\Delta_A\Delta_A} & R_{\Delta_A\Delta_\Delta} \\ R_{\Delta_\Delta\Delta_A} & R_{\Delta_\Delta\Delta_\Delta} \end{bmatrix}^{-1} \begin{bmatrix} \delta_0 \\ 0 \end{bmatrix}}$$

$$= \frac{\begin{bmatrix} B_{11} \\ B_{21} \end{bmatrix} \delta_0}{\delta_0^H B_{11} \delta_0},$$

$$\begin{bmatrix} R_{\Delta_A\Delta_A} & R_{\Delta_A\Delta_\Delta} \\ R_{\Delta_\Delta\Delta_A} & R_{\Delta_\Delta\Delta_\Delta} \end{bmatrix}^{-1} = \begin{bmatrix} B_{11} & B_{12} \\ B_{21} & B_{22} \end{bmatrix}, \text{ and}$$

$$B_{11} = (R_{\Delta_A\Delta_A} - R_{\Delta_A\Delta_\Delta} R_{\Delta_\Delta\Delta_\Delta}^{-1} R_{\Delta_\Delta\Delta_A})^{-1}$$

$$B_{21} = -R_{\Delta_\Delta\Delta_\Delta}^{-1} R_{\Delta_\Delta\Delta_A} B_{11},$$

where $\hat{\Delta}_A$ is the modified azimuth difference signal 156.

Further, the signal selection module 302 sends the sum signal 128 and the azimuth difference signal 130 to the third space-time adaptive processing module 308. The third space-time adaptive processing module 308 generates the second modified sum signal 152 using the sum signal 128 and the azimuth difference signal 130.

Space-time adaptive processing 146 suppresses the contributions of the sources 144 other than the target object 114 to the sum signal 128 and the azimuth difference signal 130 to form the second modified sum signal 152. In this manner, the second modified sum signal 152 may comprise mostly the contributions from the target object 114.

The second modified sum signal 152 is defined as follows:

$$\hat{\Sigma}_E = \hat{W}_{\Sigma_E}^T \begin{bmatrix} \Sigma \\ \Delta_A \end{bmatrix}, \text{ where}$$

$$\hat{W}_{\Sigma_E} = \frac{\begin{bmatrix} R_{\Sigma\Sigma} & R_{\Sigma\Delta_A} \\ R_{\Delta_A\Sigma} & R_{\Delta_A\Delta_A} \end{bmatrix}^{-1} \begin{bmatrix} \delta_0^T \\ 0 \end{bmatrix}}{[\delta_0^T \ 0] \begin{bmatrix} R_{\Sigma\Sigma} & R_{\Sigma\Delta_A} \\ R_{\Delta_A\Sigma} & R_{\Delta_A\Delta_A} \end{bmatrix}^{-1} \begin{bmatrix} \delta_0^T \\ 0 \end{bmatrix}}, \text{ and}$$

where $\hat{\Sigma}_E$ is the second modified sum signal 152.

The signal selection module 302 sends the elevation difference signal 132 and the diagonal difference signal 134 to the fourth space-time adaptive processing module 310. The fourth space-time adaptive processing module 310 generates the modified elevation difference signal 158 using the elevation difference signal 132 and the diagonal difference signal 134.

Space-time adaptive processing 146 suppresses the contributions of the sources 144 other than the target object 114 to the elevation difference signal 132 and the diagonal difference signal 134 to form the modified elevation difference signal 158. In this manner, the modified elevation difference signal 158 may comprise mostly the contributions from the target object 114.

The modified elevation difference signal 158 may be defined as follows:

$$\hat{\Delta}_E = \hat{W}_{\Delta_E}^T \begin{bmatrix} \Delta_E \\ \Delta_\Delta \end{bmatrix}, \text{where}$$

$$\hat{W}_{\Delta_E} = \frac{\begin{bmatrix} R_{\Delta_E\Delta_E} & R_{\Delta_E\Delta_\Delta} \\ R_{\Delta_\Delta\Delta_E} & R_{\Delta_\Delta\Delta_\Delta} \end{bmatrix}^{-1} \begin{bmatrix} \delta_0 \\ 0 \end{bmatrix}}{\begin{bmatrix} \delta_0^T & 0 \end{bmatrix} \begin{bmatrix} R_{\Delta_E\Delta_E} & R_{\Delta_E\Delta_\Delta} \\ R_{\Delta_\Delta\Delta_E} & R_{\Delta_\Delta\Delta_\Delta} \end{bmatrix}^{-1} \begin{bmatrix} \delta_0 \\ 0 \end{bmatrix}}, \text{and}$$

where $\hat{\Delta}_E$ is the modified elevation difference signal 158.

As depicted, the detection module 312 uses the first modified sum signal 150 and the second modified sum signal 152 to detect the target object 114. In these illustrative examples, the greater of the first modified sum signal 150 and the second modified sum signal 152 is compared to a selected threshold. When the greater of these two signals is greater than the selected threshold, a detection of the target object 114 occurs. Of course, in other illustrative examples, an average of the first modified sum signal 150 and the second modified sum signal 152 may be compared to the selected threshold.

The detection module 312 also may use at least one of the first modified sum signal 150 and the second modified sum signal 152 to determine the distance 120 of the target object 114 with respect to the sensor system 102. When the electromagnetic waves 113 received by the sensor system 102 are in response to electromagnetic waves 113 transmitted by the sensor system 102 towards the target object 114, the distance 120 of the target object 114 may be determined based on the time at which the response to electromagnetic waves 113 are received.

The azimuth module 314 uses the first ratio 160 of the modified azimuth difference signal 156 to the first modified sum signal 150 to identify the azimuth angle 124 of the target object 114 with respect to the sensor system 102. Further, the elevation module 316 uses the second ratio 162 of the modified elevation difference signal 158 to the second modified sum signal 152 to identify elevation angle 126 of the target object 114 with respect to the sensor system 102.

In particular, the azimuth module 314 and the elevation module 316 identify the azimuth angle 124 and the elevation angle 126 using the following:

$$u = f^{-1}\left\{\frac{\hat{\Delta}_A}{\hat{\Sigma}_A}\right\}$$

-continued $$v = f^{-1}\left\{\frac{\hat{\Delta}_E}{\hat{\Sigma}_E}\right\},$$

while taking into account $u=\cos(\text{elevation})\sin(\text{azimuth})$ $v=\sin(\text{elevation})$, where $f^{-1}$ indicates a table look-up, $$\frac{\hat{\Delta}_A}{\hat{\Sigma}_A}$$

is the first ratio 160, and $$\frac{\hat{\Delta}_E}{\hat{\Sigma}_E}$$

is the second ratio 162.

As one illustrative example, the azimuth module 314 uses the azimuth look-up table 164 from FIG. 1 to identify an azimuth angle 124 that corresponds to the first ratio 160. The azimuth look-up table 164 identifies different values for the ratio of the azimuth difference signal 130 generated by the sensor system 102 to the sum signal 128 generated by the sensor system 102 in the absence of noise given the different azimuth angles of an object with respect to the sensor system 102. The azimuth module 314 compares the first ratio 160 to the difference values identified in the azimuth look-up table 164 to identify the azimuth angle 124 for the target object 114.

Similarly, the elevation module 316 uses the elevation look-up table 166 from FIG. 1 to identify an elevation angle 126 that corresponds to the second ratio 162. The elevation look-up table 166 identifies different values for the ratio of the elevation difference signal 132 generated by the sensor system 102 to the sum signal 128 generated by the sensor system 102 in the absence of noise given the different elevation angles of an object with respect to the sensor system 102. The elevation module 316 compares the second ratio 162 to the different values identified in the elevation look-up table 166 to identify the elevation angle 126 for the target object 114.

Further, the adaptive weights for the sum signal 128 may be the same as the adaptive weights for the azimuth difference signal 130 and the elevation difference signal 132 such that $A_{11}=B_{11}$, $A_{21}=B_{22}$. Further, the conventional monopulse ratio of a difference signal to a sum signal may be approximately the same as the ratio of the diagonal difference signal 134 to the azimuth difference signal 130 or the ratio of the diagonal difference signal 134 to the elevation difference signal 132. In this manner, $g_\Sigma(u,v)g_{\Delta_\Delta}(u,v)=g_{\Delta_A}(u,v)g_{\Delta_E}(u,v)$ such that $$m_A(u) = \frac{\hat{\Delta}_A}{\hat{\Sigma}_A} = \frac{g_{\Delta_A}(u,v)\hat{h}(f_t,v)s(t)}{g_\Sigma(u,v)\hat{h}(f_t,v)s(t)}.$$

The ĥ($f_r$,v) terms in the numerator and denominator of the second ratio 162 cancel such that the second ratio 162 is not distorted by the joint angle and Doppler response function. This type of preserving of the first ratio 160 and the second ratio 162 allows the azimuth look-up table 164 and the elevation look-up table 166 to be used in identifying the azimuth angle 124 and the elevation angle 126, respectively.

Figure 4:
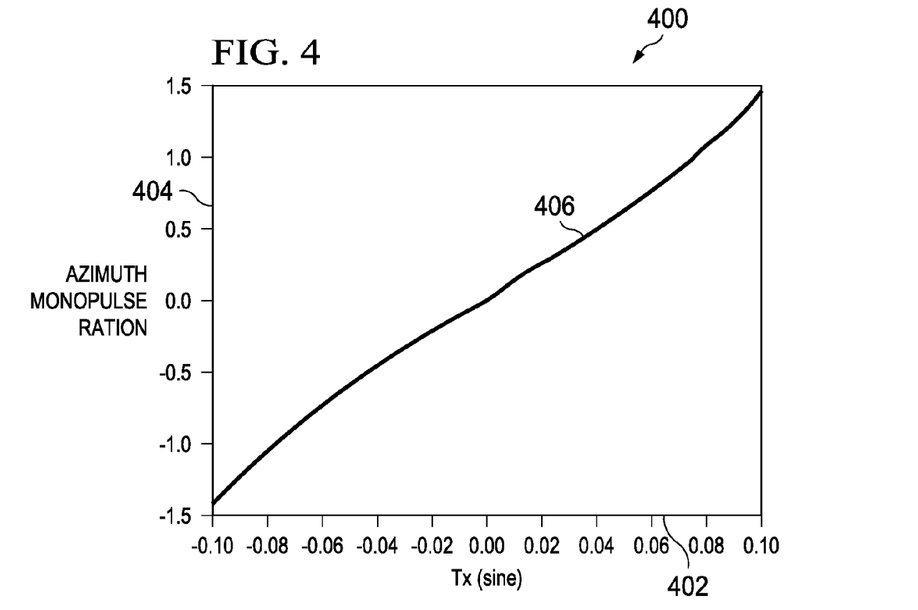
FIG. 4 is an illustration of a graph of a monopulse ratio curve in accordance with an advantageous embodiment.

With reference now to FIG. 4, an illustration of a graph of a monopulse ratio curve is depicted in accordance with an advantageous embodiment. In this illustrative example, a graph 400 includes a horizontal axis 402 and a vertical axis 404. The horizontal axis 402 is the sine of the azimuth angle, while the vertical axis 404 is a value for a ratio, such as first ratio 160 in FIG. 1.

In particular, the curve 406 in the graph 400 identifies the different values for the ratio of the azimuth difference signal 130 generated by the sensor system 102 to the sum signal 128 generated by the sensor system 102 in the absence of noise given the different azimuth angles of an object with respect to the sensor system 102. This graph 400 may be used in generating the azimuth look-up table 164. For example, if the first ratio 160 identified by the signal processing system 104 is 0.5, the signal processing system 104 may identify the sine of the azimuth angle as 0.04. This value may then be used to identify the azimuth angle 124 of the target object 114 with respect to the sensor system 102 in FIG. 1.

Figure 5:
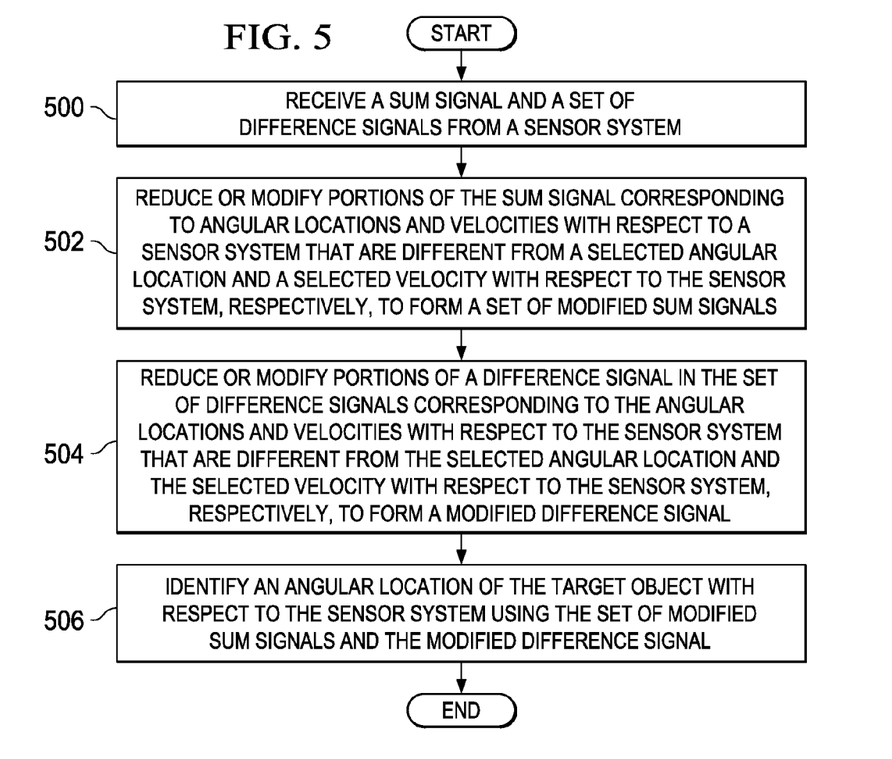
FIG. 5 is an illustration of a flowchart of a process for tracking objects in accordance with an advantageous embodiment.

With reference now to FIG. 5, an illustration of a flowchart of a process for tracking objects is depicted in accordance with an advantageous embodiment. The process illustrated in FIG. 5 may be implemented using the signal processing system 104 described in FIG. 1 and in FIG. 3 to process signals received from the sensor system 102 in FIG. 1.

The process begins by receiving a sum signal 128 and a set of difference signals 129 from a sensor system 102 (operation 500). In operation 500, the set of difference signals 129 may include the azimuth difference signal 130, the elevation difference signal 132, and the diagonal difference signal 134.

The process then reduces or modifies portions of the sum signal 128 corresponding to angular locations and velocities with respect to the sensor system 102 that are different from a selected angular location 145 and a selected velocity 147 with respect to the sensor system 102, respectively, to form a set of modified sum signals 148 (operation 502). Operation 502 is performed using space-time adaptive processing 146 in FIG. 1.

The process then reduces or modifies portions of a difference signal in the set of difference signals 129 corresponding to the angular locations and velocities with respect to the sensor system 102 that are different from the selected angular location 145 and the selected velocity 147 with respect to the sensor system 102, respectively, to form a modified difference signal (operation 504). Operation 504 is also performed using space-time adaptive processing 146 in FIG. 1. The difference signal may be azimuth difference signal 130 or the elevation difference signal 132.

Thereafter, the process identifies an angular location 122 of the target object 114 with respect to the sensor system 102 using the set of modified sum signals 148 and the modified difference signals (operation 506), with the process terminating thereafter.

Figure 6:
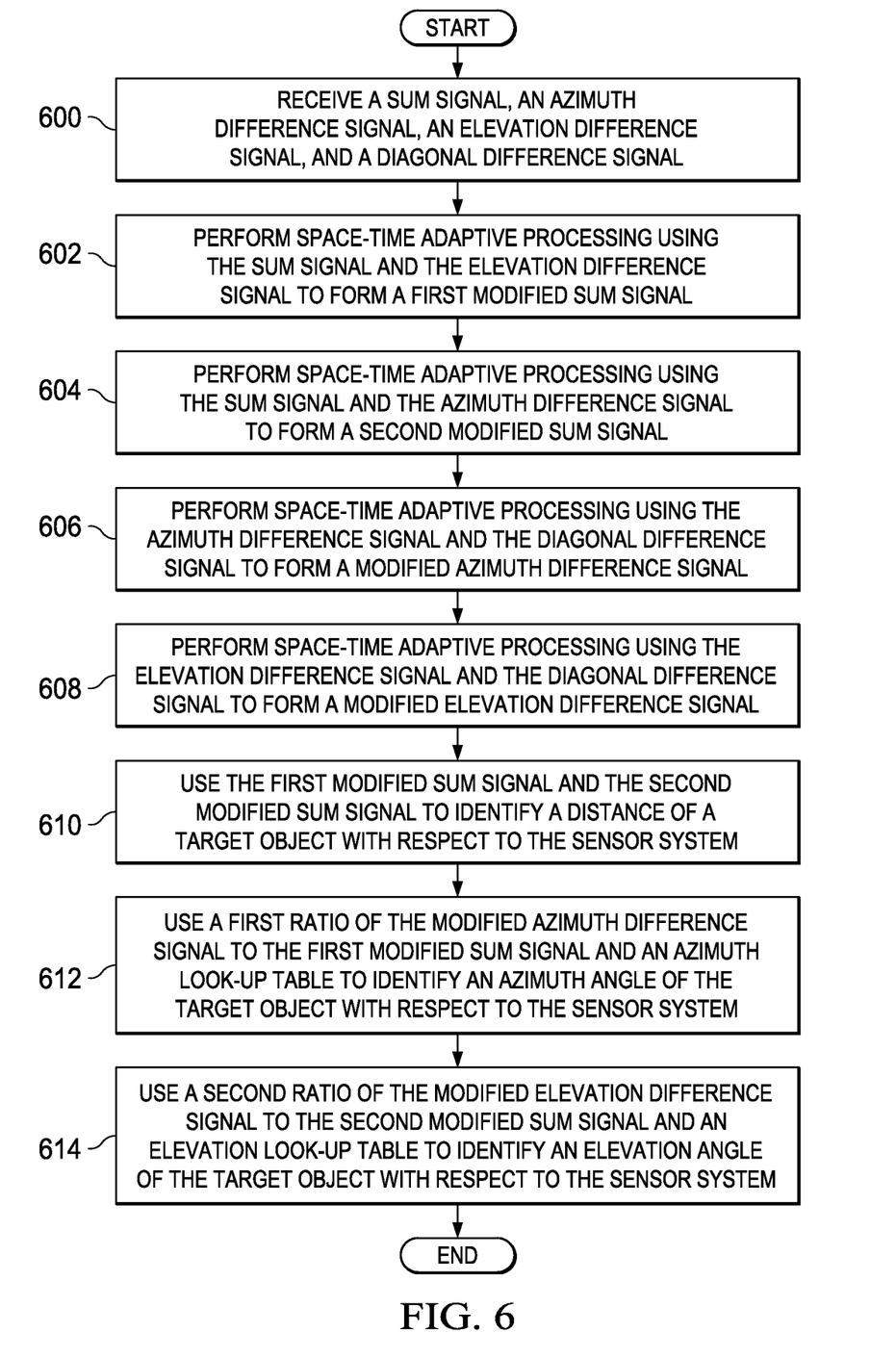
FIG. 6 is an illustration of a flowchart of a process for identifying the location of a target object in accordance with an advantageous embodiment.

With reference now to FIG. 6, an illustration of a flowchart of a process for identifying the location of a target object is depicted in accordance with an advantageous embodiment. The process illustrated in FIG. 6 may be implemented using the signal processing system 104 described in FIG. 1 and in FIG. 3 to process signals received from the sensor system 102 in FIG. 1. Further, the process described in FIG. 6 is a more detailed description of the process described in FIG. 5.

The process begins by receiving a sum signal 128, an azimuth difference signal 130, an elevation difference signal 132, and a diagonal difference signal 134 (operation 600). The process performs space-time adaptive processing 146 using the sum signal 128 and the elevation difference signal 132 to form a first modified sum signal 150 (operation 602). The process then performs space-time adaptive processing 146 using the sum signal 128 and the azimuth difference signal 130 to form a second modified sum signal 152 (operation 604).

Thereafter, the process performs space-time adaptive processing 146 using the azimuth difference signal 130 and the diagonal difference signal 134 to form a modified azimuth difference signal 156 (operation 606). Similarly, the process performs space-time adaptive processing 146 using the elevation difference signal 132 and the diagonal difference signal 134 to form a modified elevation difference signal 158 (operation 608).

Next, the process uses the first modified sum signal 150 and the second modified sum signal 152 to identify a distance 120 of a target object 114 with respect to the sensor system 102 (operation 610). In operation 610, the process uses a maximum value for the first modified sum signal 150 and the second modified sum signal 152 to detect the target object 114 identify the distance 120.

The process then uses a first ratio 160 of the modified azimuth difference signal 156 to the first modified sum signal 150 and an azimuth look-up table 164 to identify an azimuth angle 124 of the target object 114 with respect to the sensor system 102 (operation 612). The process uses a second ratio 162 of the modified elevation difference signal 158 to the second modified sum signal 152 and an elevation look-up table 166 to identify an elevation angle 126 of the target object 114 with respect to the sensor system 102 (operation 614), with the process terminating thereafter.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion or portions of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
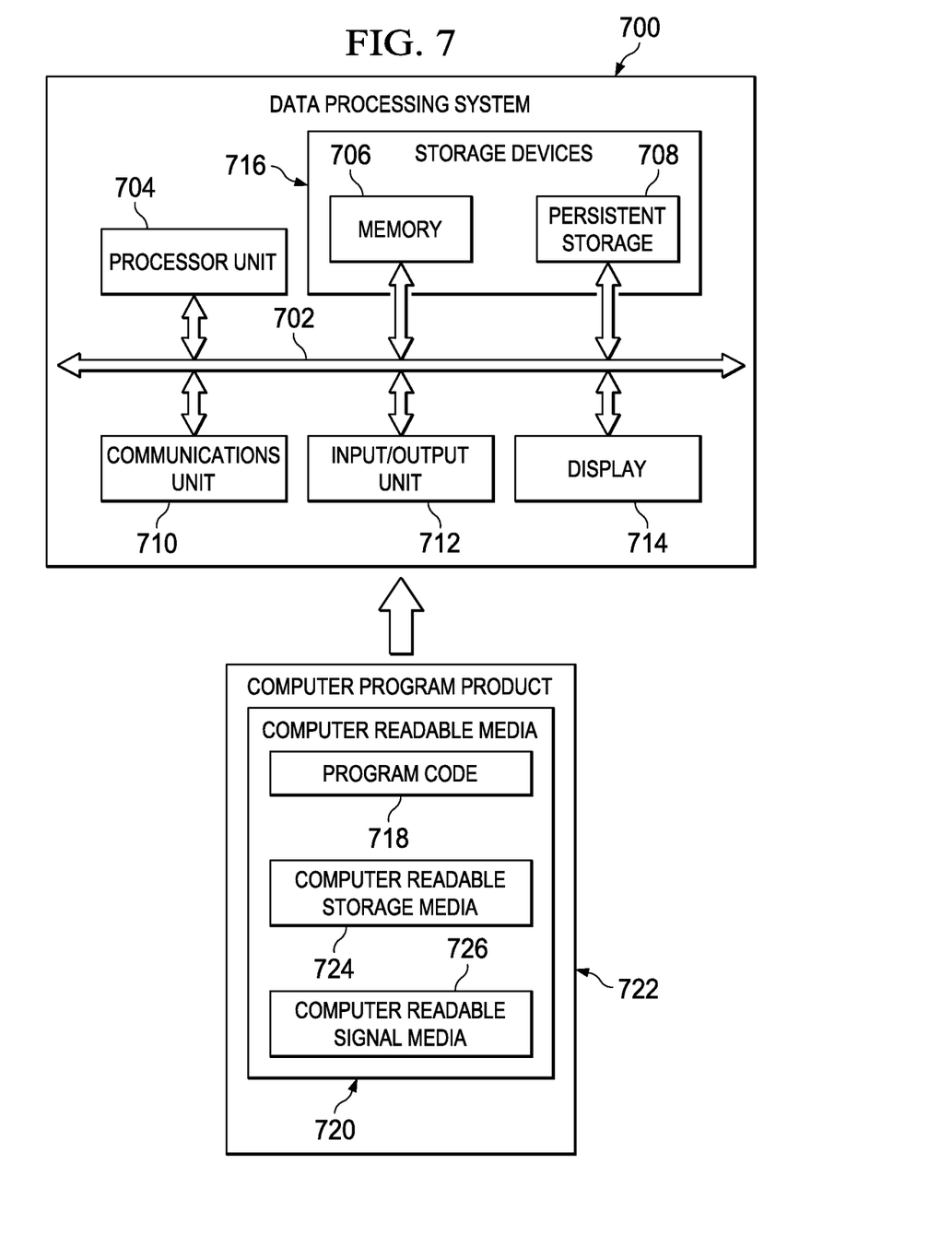
FIG. 7 is an illustration of a block diagram of a data processing system in accordance with an advantageous embodiment.

Turning now to FIG. 7, an illustration of a block diagram of a data processing system is depicted in accordance with an advantageous embodiment. In this illustrative example, data processing system 700 may be used to implement one or more computers in computer system 106 in FIG. 1. Data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. "A number", as used herein with reference to an item, may mean one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other information that is stored either on a temporary basis and/or a permanent basis. Storage devices 716 may also be referred to as computer readable storage devices in these examples. Memory 706, in these examples, may be, for example, a random access memory or any other volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or any other input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708.

Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other type of signal. These signals may be transmitted over communications links, such as wireless communications links, optical fiber cable, coaxial cable, a wire, and/or any other device or medium which enables signal communication. In other words, the communications link and/or the connection may be physical or wireless in the illustrative examples.

In some advantageous embodiments, program code 718 may be downloaded over a network to persistent storage 708 from another device or data processing system through computer readable signal media 726 for use within data processing system 700. For instance, program code 718 stored in a computer readable storage medium in a server data processing system may be downloaded over a network from the server to data processing system 700. The data processing system providing program code 718 may be a server computer, a client computer, or any other device capable of storing and transmitting program code 718.

The different components illustrated for data processing system 700 are not meant to provide architectural limitations to the manner in which different embodiments may be implemented. The different advantageous embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or any other type of hardware configured to perform a number of operations. With a programmable logic device, the device is configured to perform the number of operations. The device may be reconfigured at a later time or may be permanently configured to perform the number of operations. Examples of programmable logic devices include, for example, without limitation, a programmable logic array, a programmable array logic, a field programmable logic array, a field programmable gate array, and any other type of logic device. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications fabric 702.

Thus, the different advantageous embodiments provide a method and apparatus for identifying locations of objects. In one advantageous embodiment, a method for identifying locations of objects is provided. A portion or portions of a sum signal corresponding to angular locations and velocities with respect to a sensor system that are different from a selected angular location and a selected velocity with respect to the sensor system, respectively, is modified to form a set of modified sum signals. A portion or portions of a difference signal corresponding to the angular locations and the velocities with respect to the sensor system that are different from the selected angular location and the selected velocity with respect to the sensor system, respectively, is modified to form a modified difference signal. An angular location of a target object is identified with respect to the sensor system using the set of modified sum signals and the modified difference signal.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying locations of objects using a signal processing system, the method comprising:

modifying a portion of a sum signal corresponding to angular locations and velocities with respect to a sensor system that are different from a selected angular location and a selected velocity with respect to the sensor system, respectively, to form a set of modified sum signals;

modifying a portion of a difference signal corresponding to the angular locations and the velocities with respect to the sensor system that are different from the selected angular location and the selected velocity with respect to the sensor system, respectively, to form a modified difference signal; and identifying an angular location of a target object with respect to the sensor system using the set of modified sum signals and the modified difference signal.

2. The method of claim 1, wherein the step of modifying the portion of the sum signal comprises:

modifying the portion of the sum signal corresponding to the angular locations and the velocities with respect to the sensor system that are different from the selected angular location and the selected velocity with respect to the sensor system, respectively, using an elevation difference signal to form a modified sum signal in the set of modified sum signals.

3. The method of claim 2, wherein the difference signal is an azimuth difference signal and wherein the step of modifying the portion of the difference signal comprises:

modifying the portion of the azimuth difference signal corresponding to the angular locations and the velocities with respect to the sensor system that are different from the selected angular location and the selected velocity with respect to the sensor system, respectively, using a diagonal difference signal to form a modified azimuth difference signal.

4. The method of claim 3, wherein the step of identifying the angular location of the target object with respect to the sensor system comprises:

identifying an azimuth angle of the target object with respect to the sensor system using a ratio of the modified azimuth difference signal to the modified sum signal.

5. The method of claim 4, wherein identifying the azimuth angle of the target object with respect to the sensor system comprises:

identifying the azimuth angle of the target object with respect to the sensor system using the ratio of the modified azimuth difference signal to the modified sum signal and an azimuth look-up table.

6. The method of claim 1, wherein the step of modifying the portion of the sum signal comprises:

modifying the portion of the sum signal corresponding to the angular locations and the velocities with respect to the sensor system that are different from the selected angular location and the selected velocity with respect to the sensor system, respectively, using an azimuth difference signal to form a modified sum signal in the set of modified sum signals.

7. The method of claim 6, wherein the difference signal is an elevation difference signal and wherein the step of modifying the portion of the difference signal comprises:

modifying the portion of the elevation difference signal corresponding to the angular locations and the velocities with respect to the sensor system that are different from the selected angular location and the selected velocity with respect to the sensor system, respectively, using a diagonal difference signal to form a modified elevation difference signal.

8. The method of claim 7, wherein the step of identifying the angular location of the target object with respect to the sensor system comprises:
identifying an elevation angle of the target object with respect to the sensor system using a ratio of the modified elevation difference signal to the modified sum signal.

9. The method of claim 8, wherein identifying the angular location of the target object with respect to the sensor system comprises:
identifying an elevation angle of the target object with respect to the sensor system using the ratio of the modified elevation difference signal to the modified sum signal and an elevation look-up table.

10. The method of claim 1, wherein modifying the portion of the sum signal comprises:
modifying the portion of the sum signal caused by sources other than the target object using space-time adaptive processing to form the set of modified sum signals.

11. The method of claim 1, wherein modifying the portion of the difference signal comprises:
modifying the portion of the difference signal caused by sources other than the target object using space-time adaptive processing to form the modified difference signal.

12. The method of claim 1 further comprising:
identifying a distance of the target object with respect to the sensor system using the set of modified sum signals.

13. The method of claim 1, wherein the sensor system comprises an array of antenna elements and further comprising:
generating the sum signal and a set of difference signals using the array of antenna elements, wherein the array of antenna elements are divided into a first quadrant, a second quadrant, a third quadrant, and a fourth quadrant and wherein the set of difference signals includes an azimuth difference signal, an elevation difference signal, and a diagonal difference signal.

14. An apparatus comprising:
a signal processing system configured to:
modify a portion of a sum signal corresponding to angular locations and velocities with respect to a sensor system that are different from a selected angular location and a selected velocity with respect to the sensor system, respectively, to form a set of modified sum signals;
modify a portion of a difference signal corresponding to the angular locations and the velocities with respect to the sensor system that are different from the selected angular location and the selected velocity with respect to the sensor system, respectively, to form a modified difference signal; and
identify an angular location of a target object with respect to the sensor system using the set of modified sum signals and the modified difference signal.

15. The apparatus of claim 14, wherein the signal processing system is further configured to modify the portion of the sum signal corresponding to the angular locations and the velocities with respect to the sensor system that are different from the selected angular location and the selected velocity with respect to the sensor system, respectively, using an elevation difference signal and space-time adaptive processing to form a modified sum signal in the set of modified sum signals.

16. The apparatus of claim 15, wherein the difference signal is an azimuth difference signal and wherein the signal processing system is further configured to modify a portion of the azimuth difference signal corresponding to the angular locations and the velocities with respect to the sensor system that are different from the selected angular location and the selected velocity with respect to the sensor system, respectively, using a diagonal difference signal and the space-time adaptive processing to form a modified azimuth difference signal.

17. The apparatus of claim 16, wherein the signal processing system is further configured to identify an azimuth angle of the target object with respect to the sensor system using a ratio of the modified azimuth difference signal to the modified sum signal and an azimuth look-up table.

18. The apparatus of claim 14, wherein the signal processing system is further configured to modify the portion of the sum signal corresponding to the angular locations and the velocities with respect to the sensor system that are different from the selected angular location and the selected velocity with respect to the sensor system, respectively, using an azimuth difference signal and space-time adaptive processing to form a modified sum signal in the set of modified sum signals.

19. The apparatus of claim 18, wherein the difference signal is an elevation difference signal and wherein the signal processing system is further configured to modify a portion of the elevation difference signal corresponding to the angular locations and the velocities with respect to the sensor system that are different from the selected angular location and the selected velocity with respect to the sensor system, respectively, using a diagonal difference signal and the space-time adaptive processing to form a modified elevation difference signal.

20. The apparatus of claim 19, wherein the signal processing system is further configured to identify an elevation angle of the target object with respect to the sensor system using a ratio of the modified elevation difference signal to the modified sum signal and an elevation look-up table.

21. A computer system comprising:
a bus system;
a storage device connected to the bus system, wherein program code is stored in the storage device; and
a processor unit connected to the bus system, wherein the processor unit is configured to run the program code to modify a portion of a sum signal corresponding to angular locations and velocities with respect to a sensor system that are different from a selected angular location and a selected velocity with respect to the sensor system, respectively, to form a set of modified sum signals; modify a portion of a difference signal corresponding to the angular locations and the velocities with respect to the sensor system that are different from the selected angular location and the selected velocity with respect to the sensor system, respectively, to form a modified difference signal; and identify an angular location of a target object with respect to the sensor system using the set of modified sum signals and the modified difference signal.

* * * * *